(12) United States Patent
Norman

(10) Patent No.: US 10,442,353 B1
(45) Date of Patent: Oct. 15, 2019

(54) CHILD SAFETY ASSEMBLY

(71) Applicant: Tyshane Norman, Dallas, TX (US)

(72) Inventor: Tyshane Norman, Dallas, TX (US)

( * ) Notice: Subject to any disclaimer, the term of this patent is extended or adjusted under 35 U.S.C. 154(b) by 0 days.

(21) Appl. No.: 15/954,695

(22) Filed: Apr. 17, 2018

(51) Int. Cl.
B60Q 9/00 (2006.01)
B60N 2/28 (2006.01)
B60N 2/00 (2006.01)

(52) U.S. Cl.
CPC ............ B60Q 9/00 (2013.01); B60N 2/002 (2013.01); B60N 2/28 (2013.01)

(58) Field of Classification Search
CPC ............ B60Q 9/00; B60N 2/002; B60N 2/28
USPC ........................................ 340/457
See application file for complete search history.

(56) References Cited

U.S. PATENT DOCUMENTS

| 6,535,137 | B1 | | 3/2003 | Ryan | |
|---|---|---|---|---|---|
| 6,922,147 | B1 | | 7/2005 | Viksnins et al. | |
| D553,038 | S | | 10/2007 | Robinson et al. | |
| 8,768,292 | B2 | * | 7/2014 | Welch | B60N 2/002 |
| | | | | | 455/404.2 |
| 8,847,747 | B2 | | 9/2014 | Bloukos et al. | |
| 9,014,920 | B1 | | 4/2015 | Torres et al. | |
| 9,403,437 | B1 | * | 8/2016 | McDonald | B60K 37/02 |
| 9,815,407 | B1 | * | 11/2017 | Anderson | B60N 2/002 |
| 9,845,050 | B1 | * | 12/2017 | Garza | B60Q 9/00 |
| 2003/0098792 | A1 | * | 5/2003 | Edwards | B60N 2/002 |
| | | | | | 340/573.1 |
| 2003/0189165 | A1 | | 10/2003 | Samuels, Sr. | |
| 2003/0222775 | A1 | * | 12/2003 | Rackham | B60R 25/1004 |
| | | | | | 340/457 |
| 2006/0044126 | A1 | * | 3/2006 | Ho | G08B 21/22 |
| | | | | | 340/457 |
| 2006/0139159 | A1 | * | 6/2006 | Lee | B60N 2/002 |
| | | | | | 340/457 |
| 2006/0273917 | A1 | * | 12/2006 | Rams, Jr. | B60N 2/002 |
| | | | | | 340/667 |
| 2007/0096891 | A1 | * | 5/2007 | Sheriff | B60N 2/002 |
| | | | | | 340/457.1 |
| 2007/0268119 | A1 | * | 11/2007 | Cram | B60Q 9/00 |
| | | | | | 340/457 |
| 2009/0027188 | A1 | * | 1/2009 | Saban | B60N 2/002 |
| | | | | | 340/521 |
| 2010/0078978 | A1 | * | 4/2010 | Owens | B60N 2/002 |
| | | | | | 297/250.1 |
| 2011/0241867 | A1 | | 10/2011 | Neal | |
| 2014/0253313 | A1 | * | 9/2014 | Schoenberg | B60N 2/28 |
| | | | | | 340/457 |

(Continued)

FOREIGN PATENT DOCUMENTS

WO WO2015118569 8/2015

Primary Examiner — Ojiako K Nwugo

(57) ABSTRACT

A child safety assembly for inhibiting a child from being left unattended in a vehicle includes a sensing unit that may be positioned beneath a child car seat in a vehicle. The sensing unit is turned on when the sensing unit senses weight of a child in the child car seat. An alert unit is provided and the alert unit is positioned in a vehicle having the alert unit being positioned within eyesight of a driver. The alert unit is in wireless electrical communication with the sensing unit and the alert unit detects when a driver's side door of the vehicle is opened. The alert unit emits an audible alarm when the sensing unit senses the weight of the child and the driver's side door is opened. Thus, the alert unit alerts the driver presence of the child in the vehicle.

16 Claims, 5 Drawing Sheets

(56) References Cited

U.S. PATENT DOCUMENTS

| | | | |
|---|---|---|---|
| 2016/0082923 A1* | 3/2016 | Gavriel | B60R 22/48 340/438 |
| 2016/0339838 A1* | 11/2016 | Diaz | B60Q 9/00 |
| 2017/0232887 A1* | 8/2017 | Clontz | B60Q 5/005 340/457 |

* cited by examiner

CHILD SAFETY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to safety devices and more particularly pertains to a new safety device for inhibiting a child from being left unattended in a vehicle.

BRIEF SUMMARY OF THE INVENTION

An embodiment of the disclosure meets the needs presented above by generally comprising a sensing unit that may be positioned beneath a child car seat in a vehicle. The sensing unit is turned on when the sensing unit senses weight of a child in the child car seat. An alert unit is provided and the alert unit is positioned in a vehicle having the alert unit being positioned within eyesight of a driver. The alert unit is in wireless electrical communication with the sensing unit and the alert unit detects when a driver's side door of the vehicle is opened. The alert unit emits an audible alarm when the sensing unit senses the weight of the child and the driver's side door is opened. Thus, the alert unit alerts the driver presence of the child in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
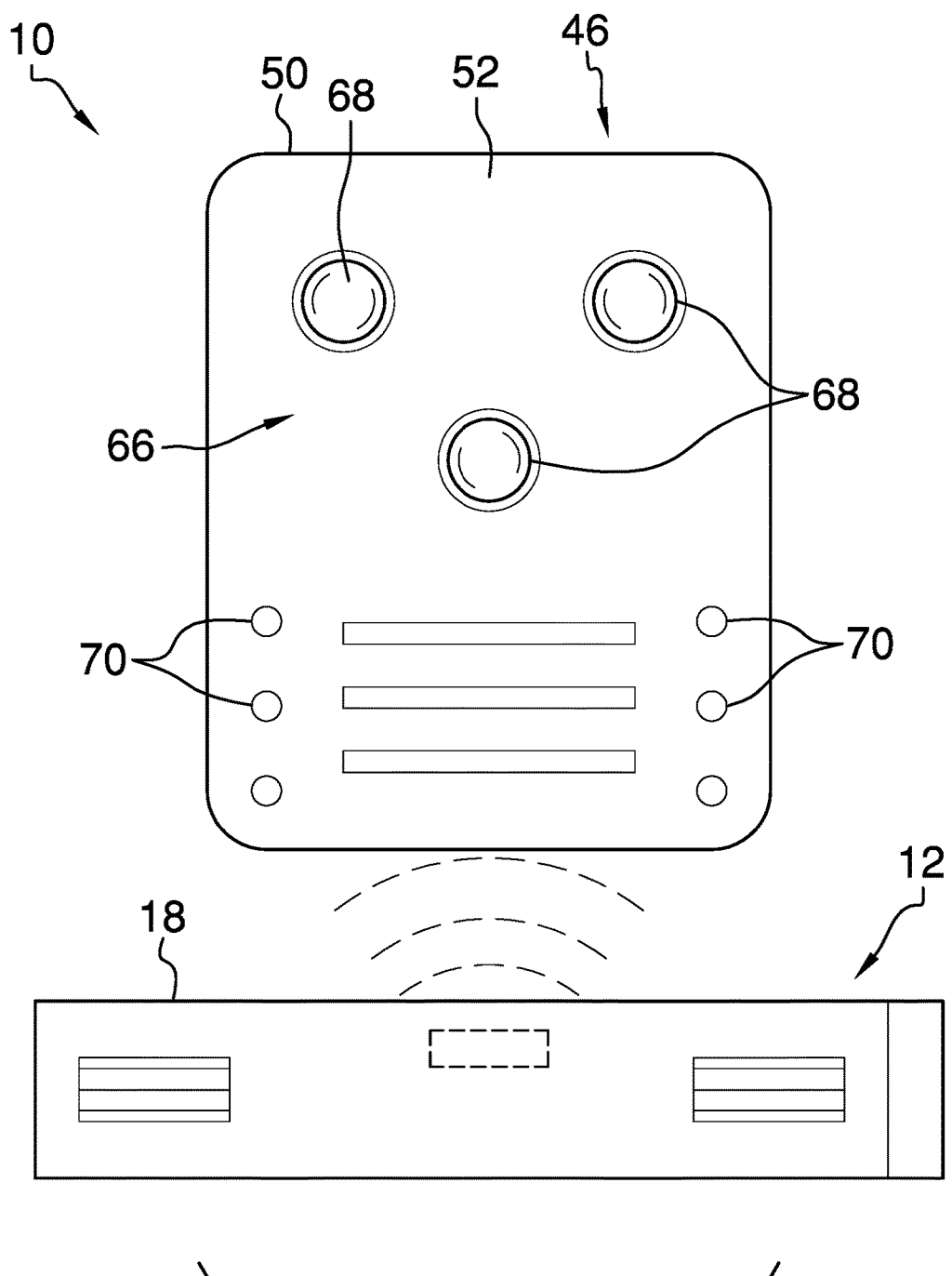
FIG. 1 is a perspective view of a child safety assembly according to an embodiment of the disclosure.
Figure 2:
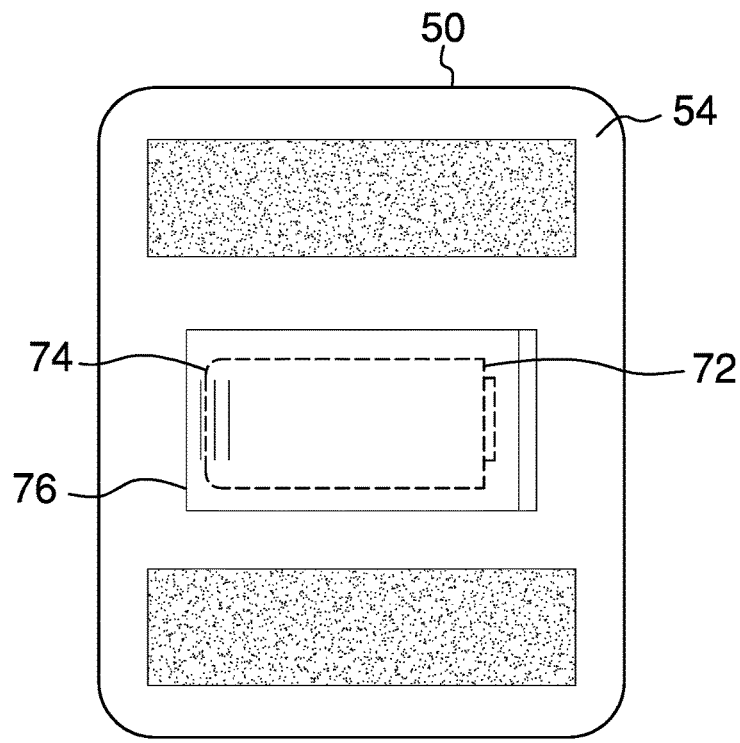
FIG. 2 is a back view of base housing of an embodiment of the disclosure.
Figure 3:
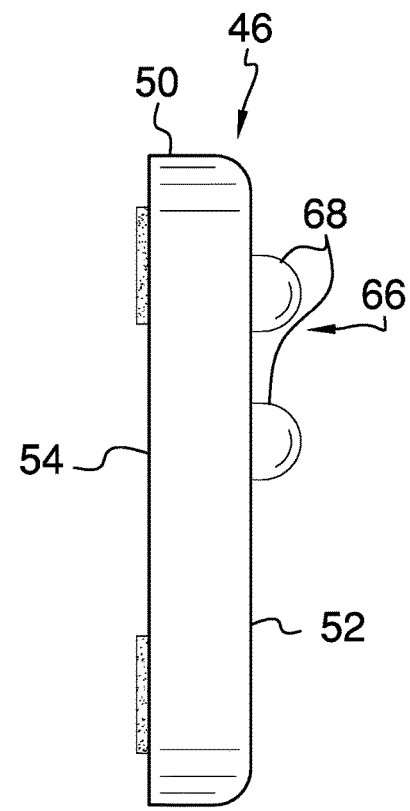
FIG. 3 is a right side view of a base housing of an embodiment of the disclosure.
Figure 4:
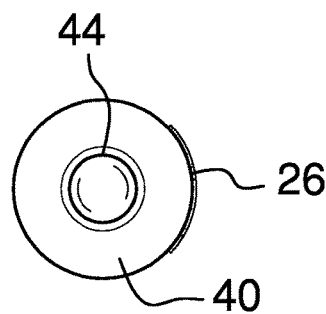
FIG. 4 is a front view of remote housing of an embodiment of the disclosure.
Figure 5:
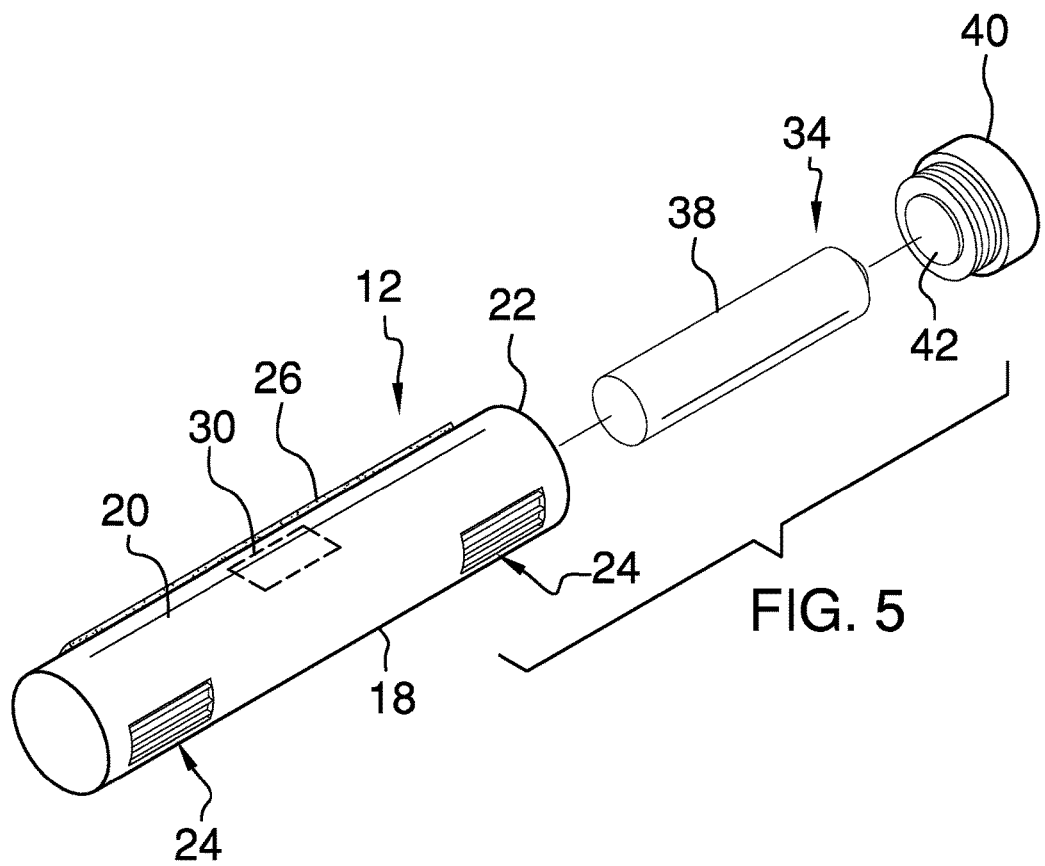
FIG. 5 is an exploded perspective view of a remote housing of an embodiment of the disclosure.
Figure 6:
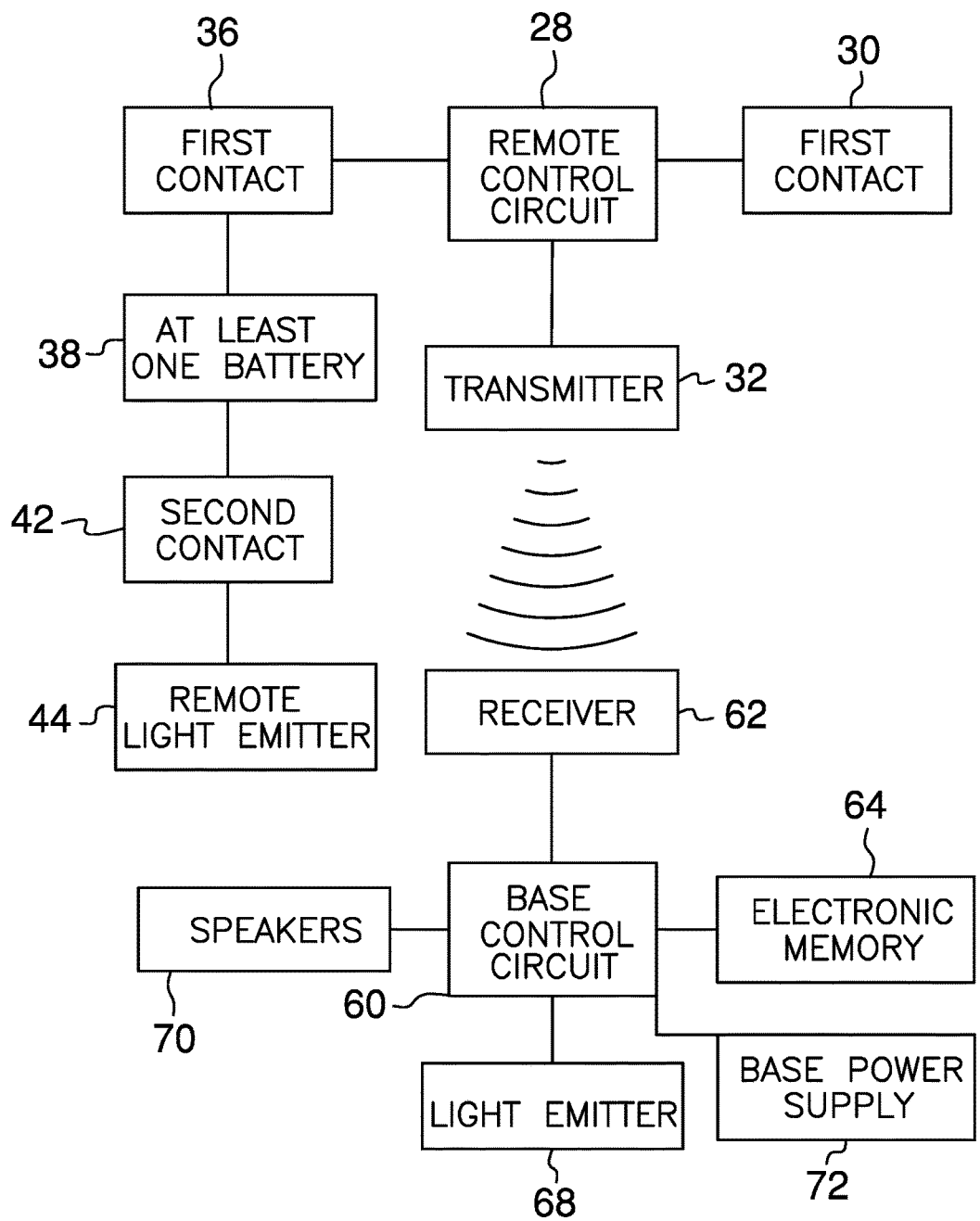
FIG. 6 is a schematic view of an embodiment of the disclosure.
Figure 7:
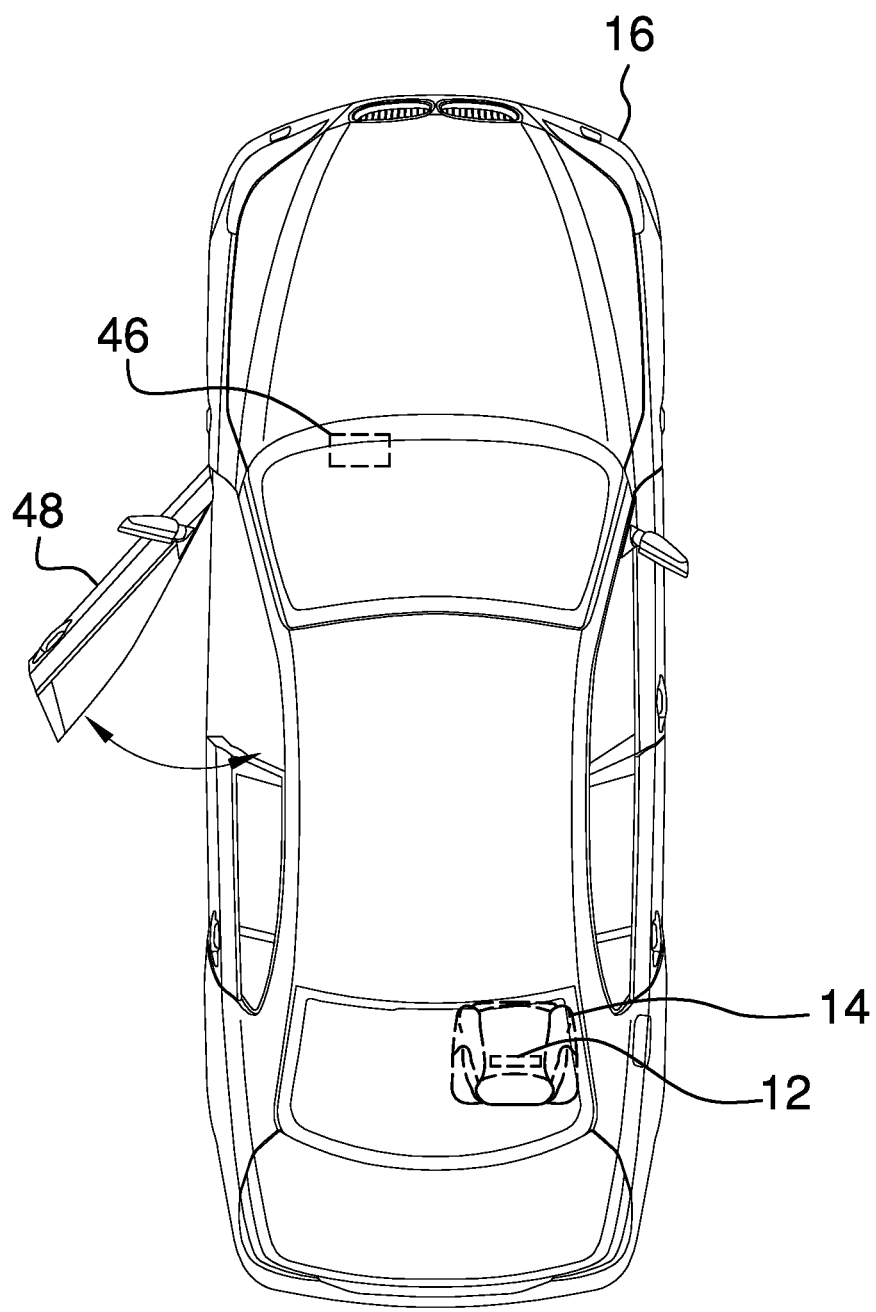
FIG. 7 is a perspective in-use view of an embodiment of the disclosure.

With reference now to the drawings, and in particular to FIGS. 1 through 7 thereof, a new safety device embodying the principles and concepts of an embodiment of the disclosure and generally designated by the reference numeral 10 will be described.

As best illustrated in FIGS. 1 through 7, the child safety assembly 10 generally comprises a sensing unit 12 that may be positioned beneath a child car seat 14 in a vehicle 16. The vehicle 16 may be a passenger vehicle 16, such as a car or a pickup, and the child car seat 14 may be a child safety seat that conforms to federal and state vehicle 16 safety laws. The sensing unit 12 is turned on when the sensing unit 12 senses weight of a child in the child car seat 14. The sensing unit 12 comprises a remote housing 18 that has an outer wall 20 and a first end 22. The first end 22 is open to access an interior of the remote housing 18. The remote housing 18 may be positioned beneath the child car seat 14 and the outer wall 20 has a plurality of vents 24 extending into the interior of the remote housing 18.

A remote mating member 26 is coupled to the outer wall 20 of the remote housing 18 to releasably engage the child car seat 14 and retaining the remote housing 18 under child car seat 14. The remote mating member 26 may be a hook portion of a hook and loop fastener for engaging a fabric cover on the child car seat 14, an adhesive strip for engaging an outer surface of the child car seat 14 and any other type of temporary mating member. A remote control circuit 28 is positioned within the remote housing 18 and a weight sensor 30 is coupled to the remote housing 18. The weight sensor 30 senses weight of the child in the child 14 car seat and the weight sensor 30 is electrically coupled to the remote control circuit 28. Moreover, the weight sensor 30 is turned on when the weight sensor 30 senses a trigger weight and the remote control circuit 28 receives a trigger input when the weight sensor 30 is turned on. The weight sensor 30 may be an electronic weight sensor or the like with a trigger threshold ranging between approximately 5.0 kg and 9.0 kg.

A transmitter 32 is positioned within the remote housing 18 and the transmitter 32 is electrically coupled the remote control circuit 28. The transmitter 32 transmits an alarm 66 signal when the remote control circuit 28 receives the trigger input. Additionally, the transmitter 32 may be a radio frequency transmitter or the like with an effective range of approximately 6.0 meters. A remote power supply 34 is positioned within the remote housing 18. The remote power supply 34 is in electrical communication with the remote control circuit 28 when the remote power supply 34 is positioned within the remote housing 18.

The remote power supply 34 comprises a first contact 36 that is positioned within the remote housing 18 and the first contact 36 is in electrical communication with the remote control circuit 28. At least one battery 38 is removably positioned within the remote housing 18. The at least one battery 38 is electrically coupled to the first contact 36 when the at least one battery 38 is removably positioned within the remote housing 18. The remote power supply 34 includes a cap 40 that is threadably coupled to the remote housing 18 to close the first end 22 of the remote housing 18.

A second contact 42 is coupled to the cap 40 and the second contact 42 is in electrical communication with the at least one battery 38 when the cap 40 is coupled to the remote housing 18. Thus, the circuit between the first contact 36 and the second contact 42 is completed when the at least one battery 38 s positioned in the remote housing 18 and the cap 40 is coupled to the remote housing 18. A remote light emitter 44 is coupled to the cap 40 and the remote light emitter 44 is electrically coupled to the second contact 42. The remote light emitter 44 is turned on when the circuit is completed between the first contact 36 and the second contact 42 and the remote light emitter 44 may be an LED or the like.

An alert unit 46 is provided and the alert unit 46 is positioned in a vehicle 16. Additionally, the alert unit 46 is positioned on the dashboard on the vehicle 16 such that the alert unit 46 is within eyesight of a driver. The alert unit 46 is in wireless electrical communication with the sensing unit 12 and the alert unit 46 in electrical communication with the vehicle 16 to detect when a driver's side door 48 of the vehicle 16 is opened. The alert unit 46 emits an audible alarm 66 when the sensing unit 12 senses the weight of the child and the driver's side door 48 is opened. In this way the alert unit 46 alerts the driver to the presence of the child in the vehicle 16 thereby reducing the likelihood that the child will be left unattended in the vehicle 16.

The alert unit 46 comprises a base housing 50 that may be positioned on a dashboard of the vehicle 16. The base housing 50 has a front wall 52 and a back wall 54, and the front wall 52 has a plurality of vents 56 extending into an interior of the base housing 50. A plurality of base mating members 58 is provided and each of base mating members 58 is coupled to the back wall 54 of the base housing 50. Thus, each of the base mating members 58 may releasably engage the dashboard.

A base control circuit 60 is provided and the base control circuit 60 is positioned within the base housing 50. The base control circuit 60 is in electrical communication with the vehicle 16's electrical system. A receiver 62 is positioned within the base housing 50 and the receiver 62 is electrically coupled to the base control circuit 60. The receiver 62 is in wireless communication with the transmitter 32 and the base control circuit 60 receives an alarm input when the receiver 62 receives the alarm signal from the transmitter 32. An electronic memory 64 is positioned within the base housing 50 and the electronic memory 64 is electrically coupled to the base control circuit 60. The electronic memory 64 stores data pertaining to spoken words and the electronic memory 64 may comprise RAM memory or the like. The spoken words may be "Hey, I'm in the back" or some other verbal reminder that the child is in the child car seat 14.

An alarm 66 is coupled to the base housing 50 and the alarm 66 is electrically coupled to the base control circuit 60. The alarm 66 is turned on when the base control circuit 60 receives the alarm input and when the base control circuit 60 detects that the driver's side door 48 is opened. Moreover, the alarm 66 comprises a plurality of light emitters 68 each coupled to the front wall 52 of the base housing 50 for emitting a visual alarm 66. The alarm 66 further includes a plurality of speakers 70 each coupled to the front wall 52 of the base housing 50 for emitting an audible alarm 66. The audible alarm 66 comprises the spoken words stored in the electronic memory 64. The base control circuit 60 may include an electronic timer, and the audible alarm 66 may be turned on a trigger duration of time after the base control circuit 60 receives the alarm input.

A base power supply 72 is positioned within the base housing 50 and the base power supply 72 is electrically coupled to the base control circuit 60. The base power supply 72 comprises at least one battery 74. A battery cover 76 is removably coupled to the back wall 54 of the base housing 50. The base power supply 72 is positioned beneath the battery cover 76 for replacing the at least one battery 74.

In use, the sensing unit 12 is positioned beneath the child car seat 14 and the cap 40 is positioned on the housing to turn on the remote control circuit 28. The base control circuit 60 is turned on when the vehicle 16 is turned on. The remote control circuit 28 receives the trigger input when the weight sensor 30 senses the trigger weight. Thus, the transmitter 32 transmits the alarm 66 signal to the receiver 62 and the base control circuit 60 receives the alarm input. The base control circuit 60 turns the alert unit on when the base control circuit 60 receives the alarm input and when the base control circuit 60 senses the driver's side door 48 is opened. Thus, the light emitters 68 are turned on and the speakers 70 are turned on to alarm 66 the driver that the child is in the child car seat 14. The remote control circuit 28 ceases receiving the trigger input when the child is removed from the child car seat 14 thereby turning off the alert unit.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A child safety assembly being configured to inhibit a child from being left unattended in a vehicle, said assembly comprising:
 a sensing unit being configured to be positioned beneath a child car seat in a vehicle, said sensing unit being turned on when said sensing unit senses weight of a child in the child car seat;
 an alert unit being configured to be positioned in a vehicle having said alert unit being positioned within eyesight of a driver, said alert unit being in wireless electrical communication with said sensing unit, said alert unit being configured to be in electrical communication with the vehicle such that said alert unit detects when a driver's side door of the vehicle is opened, said alert unit emitting an audible alarm when said sensing unit senses the weight of the child and the driver's side door is opened wherein said alert unit is configured to alert the driver presence of the child in the vehicle; and
 said sensing unit comprising a remote housing having an outer wall and a first end, said first end being open to access an interior of said remote housing, said remote housing being configured to be positioned beneath the child car seat, said outer wall having a plurality of vents extending into said interior of said remote housing.

2. The assembly according to claim 1, further comprising a remote mating member being coupled to said outer wall of said remote housing wherein said remote mating member is configured to releasably engage the child car seat for retaining said remote housing under child car seat.

3. The assembly according to claim 1, further comprising a remote control circuit being positioned within said remote housing.

4. The assembly according to claim 3, further comprising a weight sensor being coupled to said remote housing wherein said weight sensor is configured to sense weight of the child in the car seat, said weight sensor being electrically coupled to said remote control circuit, said weight sensor being turned on when said weight sensor senses a trigger weight, said remote control circuit receiving a trigger input when said weight sensor is turned on.

5. The assembly according to claim 4, further comprising a transmitter being positioned within said remote housing, said transmitter being electrically coupled said remote control circuit, said transmitter transmitting an alarm signal when said remote control circuit receives said trigger input.

6. The assembly according to claim 3, further comprising a remote power supply being positioned within said remote housing, said remote power supply being in electrical communication with said remote control circuit when said remote power supply is positioned within said remote housing.

7. The assembly according to claim 6, wherein said remote power supply comprises:
 a first contact being positioned within said remote housing; and
 at least one battery being removably positioned within said remote housing, said at least one battery being electrically coupled to said first contact when said at least one battery is removably positioned within said remote housing.

8. The assembly according to claim 7, further comprising:
 a cap being threadably coupled to said remote housing such that said cap closes said first end of said remote housing;
 a second contact being coupled to said cap such that said second contact is in electrical communication with said at least one battery when said cap is coupled to said remote housing thereby completing a circuit between said first contact and said second contact; and
 a remote light emitter being coupled to said cap, said remote light emitter being electrically coupled to said second contact such that said remote light emitter is turned on when said circuit is completed between said first contact and said second contact.

9. The assembly according to claim 5, wherein said alert unit comprises a base housing being configured to be positioned on a dashboard of the vehicle, said base housing having a front wall and a back wall, said front wall having a plurality of vents extending into an interior of said base housing.

10. The assembly according to claim 9, further comprising a plurality of base mating members, each of base mating members being coupled to said back wall of said base housing wherein each of said base mating members is configured to releasably engage the dashboard.

11. The assembly according to claim 10, further comprising a base control circuit being positioned within said base housing, said base control circuit being configured to be in electrical communication with the vehicle's electrical system.

12. The assembly according to claim 11, further comprising a receiver being positioned within said base housing, said receiver being electrically coupled to said base control circuit, said receiver being in wireless communication with said transmitter, base control circuit receiving a alarm input when said receiver receives said alarm signal from said transmitter.

13. The assembly according to claim 12, further comprising an electronic memory being positioned within said base housing, said electronic memory being electrically coupled to said base control circuit, said electronic memory storing data pertaining to spoken words.

14. The assembly according to claim 13, further comprising:
 an alarm being coupled to said base housing, said alarm being electrically coupled to said base control circuit, said alarm being turned on when said base control circuit receives said alarm input and when said base control circuit senses the driver's side door is opened;
 said alarm comprising a plurality of light emitters each being coupled to said front wall of said base housing for emitting a visual alarm; and
 said alarm comprising a plurality of speakers each being coupled to said front wall of said base housing for emitting an audible alarm comprising the spoken words stored in said electronic memory.

15. The assembly according to claim 14, further comprising a base power supply being positioned within said base housing, said base power supply being electrically coupled to said base control circuit, said base power supply comprising at least one battery.

16. A child safety assembly being configured to inhibit a child from being left unattended in a vehicle, said assembly comprising:
 a sensing unit being configured to be positioned beneath a child car seat in a vehicle, said sensing unit being turned on when said sensing unit senses weight of a child in the child car seat, said sensing unit comprising:
 a remote housing having an outer wall and a first end, said first end being open to access an interior of said remote housing, said remote housing being configured to be positioned beneath the child car seat, said outer wall having a plurality of vents extending into said interior of said remote housing;

a remote mating member being coupled to said outer wall of said remote housing wherein said remote mating member is configured to releasably engage the child car seat for retaining said remote housing under child car seat;

a remote control circuit being positioned within said remote housing;

a weight sensor being coupled to said remote housing wherein said weight sensor is configured to sense weight of the child in the car seat, said weight sensor being electrically coupled to said remote control circuit, said weight sensor being turned on when said weight sensor senses a trigger weight, said remote control circuit receiving a trigger input when said weight sensor is turned on;

a transmitter being positioned within said remote housing, said transmitter being electrically coupled said remote control circuit, said transmitter transmitting an alarm signal when said remote control circuit receives said trigger input; and a remote power supply being positioned within said remote housing, said remote power supply being in electrical communication with said remote control circuit when said remote power supply is positioned within said remote housing, said remote power supply comprising:

a first contact being positioned within said remote housing;

at least one battery being removably positioned within said remote housing, said at least one battery being electrically coupled to said first contact when said at least one battery is removably positioned within said remote housing;

a cap being threadably coupled to said remote housing such that said cap closes said first end of said remote housing;

a second contact being coupled to said cap such that said second contact is in electrical communication with said at least one battery when said cap is coupled to said remote housing thereby completing a circuit between said first contact and said second contact; and a remote light emitter being coupled to said cap, said remote light emitter being electrically coupled to said second contact such that said remote light emitter is turned on when said circuit is completed between said first contact and said second contact; and an alert unit being configured to be positioned in a vehicle having said alert unit being positioned within eyesight of a driver, said alert unit being in wireless electrical communication with said sensing unit, said alert unit being configured to be in electrical communication with the vehicle such that said alert unit detects when a driver's side door of the vehicle is opened, said alert unit emitting an audible alarm when said sensing unit senses the weight of the child and the driver's side door is opened wherein said alert unit is configured to alert the driver presence of the child in the vehicle, said alert unit comprising:

a base housing being configured to be positioned on a dashboard of the vehicle, said base housing having a front wall and a back wall, said front wall having a plurality of vents extending into an interior of said base housing;

a plurality of base mating members, each of base mating members being coupled to said back wall of said base housing wherein each of said base mating members is configured to releasably engage the dashboard;

a base control circuit being positioned within said base housing, said base control circuit being configured to be in electrical communication with the vehicle's electrical system;

a receiver being positioned within said base housing, said receiver being electrically coupled to said base control circuit, said receiver being in wireless communication with said transmitter, base control circuit receiving a alarm input when said receiver receives said alarm signal from said transmitter;

an electronic memory being positioned within said base housing, said electronic memory being electrically coupled to said base control circuit, said electronic memory storing data pertaining to spoken words;

an alarm being coupled to said base housing, said alarm being electrically coupled to said base control circuit, said alarm being turned on when said base control circuit receives said alarm input and when said base control circuit senses the driver's side door is opened, said alarm comprising a plurality of light emitters each being coupled to said front wall of said base housing for emitting a visual alarm, said alarm comprising a plurality of speakers each being coupled to said front wall of said base housing for emitting an audible alarm comprising the spoken words stored in said electronic memory; and a base power supply being positioned within said base housing, said base power supply being electrically coupled to said base control circuit, said base power supply comprising at least one battery.

* * * * *